Patented Aug. 26, 1941

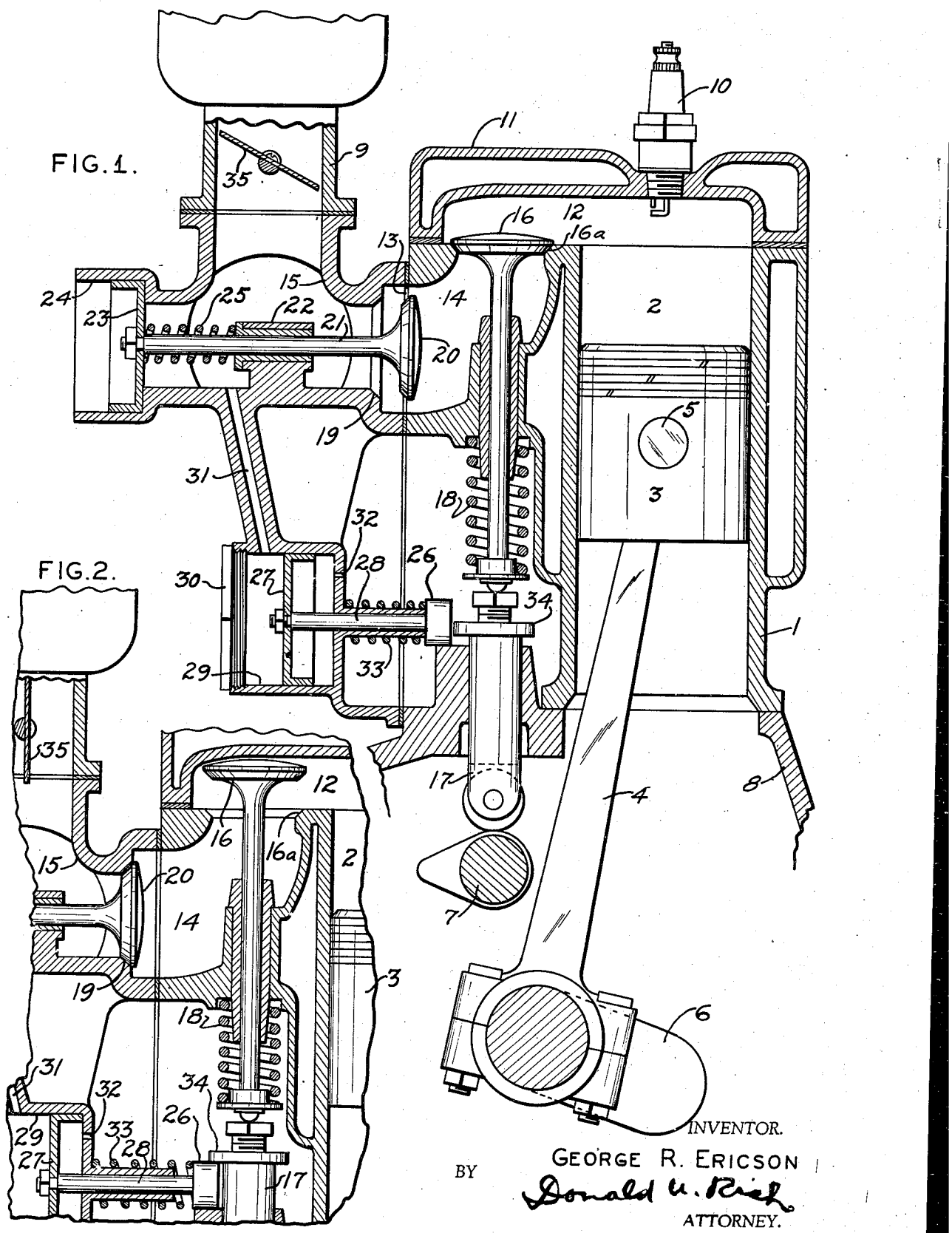

2,254,173

UNITED STATES PATENT OFFICE 2,254,173

INTERNAL COMBUSTION ENGINE

George R. Ericson, Kirkwood, Mo.

Application December 5, 1940, Serial No. 368,642

5 Claims. (Cl. 123—48)

This invention relates to internal combustion engines of the four stroke type and more particularly concerns combustion chambers and intake valves.

In the design of internal combustion engines the extent to which the combustible mixture can be compressed without resulting in pre-ignition or objectionable detonation must be considered. The practical degree to which the charge can be compressed will depend, among other things, upon the characteristics of the fuel to be used and the design and degree of cooling of the combustion chambers. It is desirable, however, from the standpoint of efficiency to compress the combustible mixture to the practical maximum permissible with any particular set of condition. In the throttle controlled type engine it will be seen that during throttled operation, the reduced amount of combustible mixture which can be drawn into the cylinders will not be compressed to as great an extent as the full charge which can be drawn in during wide open throttle operation. It will appear to be advantageous therefor, from the standpoint of efficiency, to increase the compression ratio as the indrawn charge is reduced, either by throttling or at high speed operation by restriction, in order to approach to some degree the maximum practical compression. The practical way to vary the compression ratio is of course to vary the combustion space.

There is the further consideration of valve timing in engine design; and as a fixed valve timing is, for the purpose of economizing, usually employed to take care of a wide range of operating speeds it will be seen that some loss in volume at the lower speeds will result if the valves are timed to open and close sufficiently early in the cycle to take care of the higher intake velocities occurring at higher speeds.

It is an object of the present invention to provide an internal combustion engine of the four stroke type having a throttle controlled intake conduit and in which means responsive to a decrease in pressure in the intake conduit for increasing the compression ratio is provided.

It is a further object of the present invention to provide novel intake control mechanism for an engine of the above character which results in greater volumetric efficiency over a range of engine speeds.

Other objects and advantages will appear in the following description and accompanying drawing referring to which:

Fig. 1 is a transverse section through the upper portion of a vertical engine incorporating one form of my invention. The section is taken on the center line of an intake port.

Fig. 2 is a fragmentary portion of Fig. 1 showing the intake control valve in a different operative position.

The following elements: 1, engine block; 2, cylinder; 3, piston; 4, connecting rod; 5 wrist pin; 6, crank shaft; 7, cam shaft; 8, crank case; 9, carburetor, and 10, spark plugs are conventional parts and accessories, their functions being well known and their details having no bearing on the present invention. A cylinder head 11 is provided having a recess 12 therein which forms a part of the full combustion chamber. Leading from the inlet port 13 in the left side of the block to the recess 12 is a curved passage 14 which together with recess 12 forms the full combustion chamber. Attached to the side of the block and registering with port 13 is an intake conduit 15 on which is mounted the carburetor 9. A valve seat 16ᵃ is formed at the junction of passage 14 and recess 12 and is adapted to seat an intake valve 16. The intake valve 16 is engine actuated in a conventional manner under certain conditions of operation. That is, the cam shaft 7 is geared to the crank shaft and moves the valve 16 upward, there being a cam follower 17 between the valve stem and the cam, and a comparatively strong valve spring 18 urges it closed. A second valve seat 19 is formed in the conduit 15 near its connection to the block, this seat being adapted to seat a second intake valve 20. The stem 21 of valve 20 is guided in a boss 22 and carries attached to its outer end a piston 23. The piston 23 reciprocates in a cylinder 24 formed as a part of the conduit casting 15 and is exposed to atmospheric pressure on the left side and the intake conduit pressure on the right side. A spring 25 bearing on piston 23 and boss 22 normally urges valve 20 toward a closed position. Adjacent the upper end of cam follower 17 is a block 26 attached to a piston 27 by means of a rod 28. The piston 27 reciprocates in a cylinder 29 which is also formed as a part of the intake conduit casting. The outer end of cylinder 29 is closed by a plug 30 and the cylinder is at this end in communication with the intake conduit by means of a passage 31. The inner or right end of cylinder 27 is vented to atmosphere at 32. Thus, it will be seen that piston 27 operates between atmosphere and the pressure existing in the intake conduit. A spring 33 bearing on cylinder 29 and block 26 normally urges block 26 and piston 27 toward the right. The upper end of cam follower 17 is provided with a collar 34 which abuts block 26 under certain operation conditions to hold valve 16 in an open or inoperative position as indicated in Fig. 2. A throttle valve 35 is indicated in the lower part of carburetor 9 and functions in a well known manner to control the speed of the engine.

In operation with the throttle wide open and the engine operating at comparatively low speed due to a heavy load, the velocity through the intake conduit will be comparatively low and the pressure therein consequently comparatively high. Under these conditions the spring 33 will be permitted to move block 26 into a blocking position under collar 34 of the cam follower 17 as indicated in Fig. 2. Thus rendering valve 26 inoperative. Under these same conditions, spring 25 will be permitted to lightly seat valve 20 and the engine will then be operating with the full combustion space. The valve 20 under these conditions will open and close automatically on the intake and compression strokes and of course is held closed by pressure during the working and discharge stroke. The spring 25 must obviously be comparatively light in order to minimize volume loss in the work necessary to open this valve on the intake stroke. As the speed of the engine is increased under wide open throttle conditions the velocity through the intake conduit will increase and as a consequence the pressure therein will drop and at a predetermined point the piston 23 will move to the right holding valve 20 open and piston 27 will move to the left removing block 26 from its blocking position and thereafter the engine will operate with the reduced combustion space posterior to valve 16 and valve 16 will operate to control the intake. During operation under any appreciable degree of throttling the pressure in the intake conduit will be sufficiently low to render valve 20 inoperative and hold out block 26.

It is apparent from the foregoing, therefore, that under conditions of operation wherein the intake charge is reduced a predetermined amount by throttling or by intake conduit restriction at the higher speeds the combustion space will be automatically reduced resulting in an increased compression ratio. The foregoing description and accompanying drawing are intended to be illustrative and not limiting and the exclusive use of all modifications within the scope of the appended claims is contemplated.

I claim:

1. In an internal combustion engine, a combustion chamber, an inlet to said chamber, an intake conduit leading to said inlet, a pair of intake valves arranged in series either of said valves being capable of controlling said inlet, one of said valves being engine operated and the other of said valves being flow responsive, and means for rendering said engine operated valve inoperative under conditions of comparatively high pressure in said intake conduit.

2. In an internal combustion engine, a combustion chamber, an inlet to said chamber, an intake conduit leading to said inlet, a pair of intake valves arranged in series, either of said valves being capable of controlling said inlet, one of said valves being engine operated and the other of said valves being flow responsive, said engine operated valve being posterior to said flow responsive valve, and means for rendering said engine operating valve inoperative under conditions of comparatively high pressure in said intake conduit.

3. In an internal combustion engine, a cylinder block, a head for said block, a cavity in said head, an intake passageway in said block leading to said cavity, said cavity and said intake passageway comprising a combustion chamber, an engine operated intake valve dividing said cavity and said passageway when closed, a second intake valve controlling said passageway anterior to said first mentioned valve, an intake conduit leading to said passageway, blocking means for rendering said first-mentioned valve inoperative, means responsive to a predetermined vacuum in said intake conduit for rendering said blocking means ineffective, and means responsive to a predetermined vacuum in said conduit for rendering said second valve inoperative.

4. In an internal combustion engine, a cylinder block, a head for said block, an inlet port in said block, a combustion chamber, a portion of said combustion chamber comprising a cavity in said head, another portion of said chamber having the form of a passageway leading from said inlet port to said cavity, a valve at the outlet of said passageway dividing said passageway and said cavity when closed, said valve being opened by engine driven means and closed by spring means, spring pressed blocking means for holding said valve open under certain conditions, a second valve for controlling said passageway near said inlet port, said second valve being flow responsive, an intake conduit leading to said inlet port, means responsive to comparatively low pressures in said intake conduit for retracting said blocking means, and means responsive to substantially similar pressure in said intake conduit for holding said second valve open.

5. The method of controlling the intake to the combustion chamber of an internal combustion engine which comprises opening and closing the intake in fixed relation to definite points in the engine cycle during throttled operation, and opening and closing the intake in response to pressure reversals, caused by the reciprocation of the engine piston, during unthrottled operation.

GEORGE R. ERICSON.